United States Patent
Ajith Kumar et al.

(10) Patent No.: US 10,902,548 B2
(45) Date of Patent: Jan. 26, 2021

(54) FRAME INVALIDATION CONTROL WITH CAUSALITY ATTRIBUTION

(71) Applicant: Microsoft Technology Licensing, LLC, Redmond, WA (US)

(72) Inventors: Harikrishna Menon Ajith Kumar, Redmond, WA (US); Pankaj Kachrulal Sarda, Redmond, WA (US); Carlos Pessoa, Redmond, WA (US); David William Shoots, Hollis, NH (US); Steven Brix Kirbach, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 16/169,160

(22) Filed: Oct. 24, 2018

(65) Prior Publication Data

US 2019/0057485 A1 Feb. 21, 2019

Related U.S. Application Data

(63) Continuation of application No. 14/569,664, filed on Dec. 13, 2014, now Pat. No. 10,147,158.

(51) Int. Cl.
*G06T 1/20* (2006.01)
*G06F 9/44* (2018.01)
(Continued)

(52) U.S. Cl.
CPC .............. *G06T 1/20* (2013.01); *G06F 9/44* (2013.01); *G06F 9/451* (2018.02); *G09G 5/363* (2013.01)

(58) Field of Classification Search
CPC .. G06T 1/20; G06F 9/451; G06F 9/44; G09G 5/363
See application file for complete search history.

(56) References Cited

U.S. PATENT DOCUMENTS 5,544,301 A * 8/1996 Orton .................. G09G 5/14
715/790
6,507,861 B1 1/2003 Nelson et al.
(Continued)

OTHER PUBLICATIONS

"How to identify and Fix Common Performance Issues using Windows Phone Application Analysis for Windows Phone 8", Published on: Aug. 19, 2014, <<http://msdn.microsoft.com/en-us/library/windows/apps/hh202932%28v=vs.105%29.aspx>> (copy submitted in parent U.S. Appl. No. 14/569,664, filed Dec. 13, 2014).

(Continued)

*Primary Examiner* — Barry Drennan
*Assistant Examiner* — Khoa Vu
(74) *Attorney, Agent, or Firm* — Ogilvie Law Firm

(57) ABSTRACT

Developers receive automatically designated property change events which caused invalidation of a rendered frame. Some embodiments control display invalidation in part by identifying higher-level frame bounding events in an execution trace, and applying at least one display invalidation constituency filter to lower-level thread events within a frame creation period, thereby obtaining a display invalidation constituency sequence of one or more display invalidation events. The sequence may include a layout property change event and/or a render property change event which invalidated the frame. An initial part of the sequence is designated as a display frame creation cause. Displayed frame invalidation is controlled by altering the display invalidation constituency, e.g., by manual or automated layout/render property change event elimination or event sequence location change, by a reduction in computational resource usage (e.g., memory usage, graphics processor chip usage), and/or by a reduction in thread execution time which provides a faster frame rate.

20 Claims, 5 Drawing Sheets

(51) Int. Cl.
*G09G 5/36* (2006.01)
*G06F 9/451* (2018.01)

(56) References Cited

U.S. PATENT DOCUMENTS

| | | | |
|---|---|---|---|
| 6,670,969 | B1 | 12/2003 | Halstead et al. |
| 7,012,606 | B2 | 3/2006 | Swedberg et al. |
| 7,088,374 | B2 | 8/2006 | David et al. |
| 7,853,884 | B2 | 12/2010 | Olander et al. |
| 8,640,047 | B2 | 1/2014 | Mouton et al. |
| 8,797,337 | B1 | 8/2014 | Labour et al. |
| 2002/0087949 | A1 | 7/2002 | Golender et al. |
| 2003/0174769 | A1* | 9/2003 | Nagumo ............... H04N 19/132 375/240.02 |
| 2004/0177319 | A1 | 9/2004 | Horn |
| 2005/0088452 | A1 | 4/2005 | Hanggie et al. |
| 2006/0242627 | A1* | 10/2006 | Wygodny ........... G06F 11/3636 717/128 |
| 2006/0248449 | A1 | 11/2006 | Williams et al. |
| 2006/0248451 | A1 | 11/2006 | Szyperski et al. |
| 2008/0030504 | A1 | 2/2008 | Brunner et al. |
| 2008/0211965 | A1* | 9/2008 | Lippman ............... H04N 7/0112 348/558 |
| 2010/0333072 | A1* | 12/2010 | Dulip .................. G06F 11/3419 717/128 |
| 2012/0060161 | A1 | 3/2012 | Joung et al. |
| 2012/0081378 | A1* | 4/2012 | Roy ........................ G09G 5/001 345/522 |
| 2013/0063445 | A1 | 3/2013 | Blanco et al. |
| 2013/0063452 | A1 | 3/2013 | Ali et al. |
| 2013/0063459 | A1 | 3/2013 | Schneider et al. |
| 2013/0063607 | A1* | 3/2013 | Shimotono ............ H04N 5/232 348/187 |
| 2013/0080502 | A1 | 3/2013 | McColl et al. |
| 2013/0081001 | A1 | 3/2013 | McColl et al. |
| 2013/0097520 | A1 | 4/2013 | Lewin et al. |
| 2013/0152047 | A1* | 6/2013 | Moorthi .............. G06F 11/3688 717/124 |
| 2013/0249917 | A1* | 9/2013 | Fanning ................ G06F 11/323 345/440 |
| 2014/0173359 | A1 | 6/2014 | Basava et al. |
| 2014/0245268 | A1* | 8/2014 | Golender ............ G06F 11/366 717/128 |
| 2018/0122126 | A1* | 5/2018 | Brunner .................... G06T 1/20 |

OTHER PUBLICATIONS

"Frame Rate Counters in the Emulator for Windows Phone 8", Published on: Aug. 19, 2014, <<http://msdn.microsoft.com/en-us/library/windows/apps/gg588380(v=vs.105).aspx>> (copy submitted in parent U.S. Appl. No. 14/569,664, filed Dec. 13, 2014).

Houle, Paul, "Getting back to the UI Thread in Silverlight 2 Beta 2", Published on: Jun. 25, 2008, <<http://gen5.info/q/2008/06/25/getting-back-to-the-ui-thread-in-silverlight-2/>> (copy submitted in parent U.S. Appl. No. 14,569,664, filed Dec. 13, 2014).

"About Event Tracing (Windows)", <<http://msdn.microsoft.com/en-us/library/windows/desktop/aa363668(v=vs.85).aspx>>, 3 pages, Jan. 5, 2014 (copy submitted in parent U.S. Appl. No. 14/569,664, filed Dec. 13, 2014).

"Frame rate", <<http://en.wikipedia.org/wiki/Frame_rate>>, 3 pages, Nov. 13, 2014 (copy submitted in parent U.S. Appl. No. 14/569,664, filed Dec. 13, 2014).

"Framebuffer", <<http://en.wikipedia.org/wiki/Framebuffer>>, 8 pages, Nov. 17, 2014 (copy submitted in parent U.S. Appl. No. 14/569,664, filed Dec. 13, 2014).

"HTML UI Responsiveness tool in Visual Studio 2013", <<http://blogs.msdn.com/b/visual-studioalm/archive/2013/07/16/html-ui-responsiveness-tool-in-visual-studio-2013.aspx>>, 7 pages, Jul. 16, 2013 (copy submitted in parent U.S. Appl. No. 14/569,664, filed Dec. 13, 2014).

"Instrumentation (computer programming)", <<http://en.wikipedia.org/wiki/Instrumentation_(computer_programming)>>, 2 pages, Apr. 29, 2014 (copy submitted in parent U.S. Appl. No. 14/569,664, filed Dec. 13, 2014).

"Retained Mode Versus Immediate Mode (Windows)", <<http://msdn.microsoft.com/en-us/library/windows/desktop/ff684178/(v=vs.85).aspx>>, 1 page, no later than Oct. 28, 2014 (copy submitted in parent U.S. Appl. No. 14/569,664, filed Dec. 13, 2014).

"Tracing (software)", <<http://en.wikipedia.org/wiki/Tracing_(software)>>, 5 pages, Jul. 23, 2014 (copy submitted in parent U.S. Appl. No. 14/569,664, filed Dec. 13, 2014).

"App performance considerations for Windows Phone 8", <<http://msdn.microsoft.com/en-us/library/windows/apps/ff67560(v=vs.105).aspx>>, 15 pages, Aug. 19, 2014 (copy submitted in parent U.S. Appl. No. 14/569,664, filed Dec. 13, 2014).

Peter Kuhn, "Windows Phone 7: Performance Monitoring", <<http://www.silverlightshow.net/items/Windows-Phone-7-Performance-Monitoring.aspx>>, 6 pages, Sep. 13, 2011 (copy submitted in parent U.S. Appl. No. 14/569,664, filed Dec. 13, 2014).

"International Search Report and Written Opinion Issued in PCT Application No. PCT/US2015/064162", dated Mar. 8, 2016, 12 Pages. (copy submitted in parent U.S. Appl. No. 14/569,664, filed Dec. 13, 2014).

"International Preliminary Report on Patentability Issued in PCT Application No. PCT/US2015/064162", dated Nov. 16, 2016, 7 Pages. (copy submitted in parent U.S. Appl. No. 14/569,664, filed Dec. 13, 2014).

\* cited by examiner

US 10,902,548 B2

FRAME INVALIDATION CONTROL WITH CAUSALITY ATTRIBUTION

RELATED APPLICATION

The present application claims priority to, is a continuation of, and incorporates by reference the entirety of, U.S. patent application Ser. No. 14/569,664 filed Dec. 13, 2014.

BACKGROUND

In computer graphics, "retained mode" refers to graphics libraries and other layout and/or rendering modules which retain, within one or more data structures distinct from a frame buffer, a complete or near-complete model of objects to be rendered into the frame buffer. Retained mode may be recognized as a style in application programming interfaces (APIs) of retained mode graphics libraries, for example. Calls from a library client made through a retained mode API do not directly cause rendering of pixels into the frame buffer. Instead, the retained mode graphics library updates an internal model, such as list of graphics objects, which is maintained within the library's data space. Retained mode may offer opportunities for the library to exercise control, e.g., to influence when actual rendering into the frame buffer takes place, to influence when the processing of related objects occurs, to manage double buffering, to perform occlusion culling, and/or to transfer to a renderer only data that has been changed from a previous frame. "Immediate mode" refers to an alternative to retained mode. In immediate mode calls to a graphics library cause rendering directly, instead of causing a model data structure update outside the frame buffer(s). However, a given library or graphics module may use both immediate and retained mode approaches, and may provide an API for either or both modes.

SUMMARY

Some embodiments control display invalidation in part by identifying frame bounding events in an execution trace, and applying at least one display invalidation constituency filter to thread events within a frame creation period, thereby obtaining a sequence of one or more display invalidation events. "Thread events" include events performed by a thread and recorded in the execution trace, for example. The sequence includes a frame display layout property change event and/or a frame display render property change event (an event which changes at least one layout property and also changes at least one render property is considered both a layout property change event and a render property change event). Display invalidation is controlled by altering the display invalidation constituency, e.g., by layout/render property change event elimination or sequence location change, by a reduction in computational resource usage (e.g., memory usage, graphics processor chip usage), and/or by a reduction in thread execution time which provides a faster frame rate. An initial part of the display invalidation constituency is designated as a display frame creation cause.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms

Figure 1:
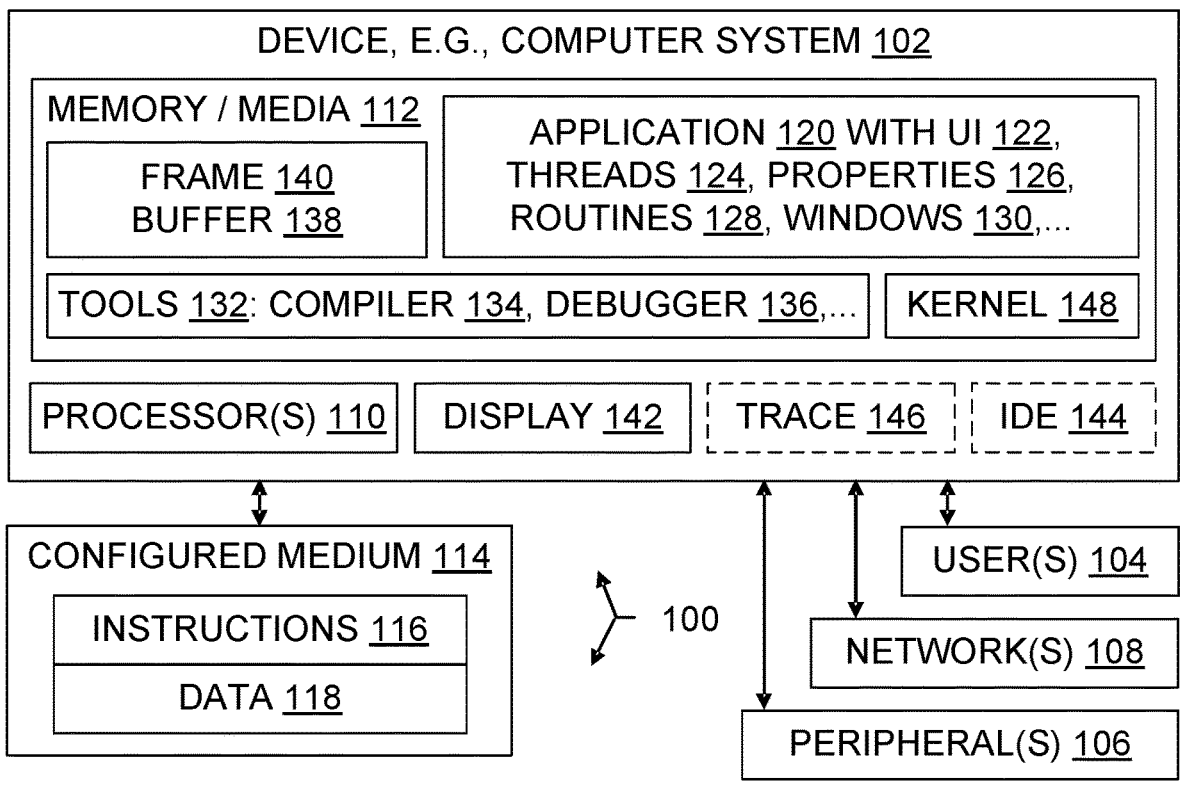
FIG. 1 is a block diagram illustrating a computer system having at least one processor and at least one memory which interact with one another under the control of frame creation software, and other items in an operating environment which may be present on multiple network nodes, and also illustrating configured storage medium (as opposed to propagated signal) embodiments.

Some acronyms are defined below, but others may be defined elsewhere herein or require no definition to be understood by one of skill.

ALU: arithmetic and logic unit
API: application program interface
CD: compact disc
CPU: central processing unit
CSS: cascading style sheets
DVD: digital versatile disk or digital video disc
FPGA: field-programmable gate array
FPS: frames per second
FPU: floating point processing unit
GPU: graphical processing unit
GUI: graphical user interface
HTML: hypertext markup language
IDE: integrated development environment, sometimes also called "interactive development environment"
RAM: random access memory
ROM: read only memory
UI: user interface

OVERVIEW

As used here, "frame" refers to a frame in a sequence of successively displayed images. A given frame may appear one or more times in the sequence, but the present teachings are particularly helpful when each frame displayed in an animation sequence has different display content than the prior frame.

A "frame buffer" is a digital memory which holds pixel data for display on a display screen. Such pixel data is an example of "display content."

"Frame rate" is the number of frames displayed within a given time period. Progressive scanning is assumed in the examples herein unless interlacing is indicated, but the teachings provided apply regardless.

Frame rate can be identified either as the number of frames per second, or as the duration of a given frame. A frame rate of 24 FPS (frames per second), for example, corresponds to a frame duration of $1/24^{th}$ of a second, which is about 42 ms (milliseconds). 25 FPS corresponds to a frame lasting exactly 40 ms, 30 FPS corresponds to a frame length of about 33 ms, 46 FPS corresponds to frames that are approximately 22 ms, and so on. Progressive formats that operate at 24 FPS or 25 FPS are well known. Thomas Edison indicated that 46 FPS is the minimum needed for the human visual cortex to avoid eye strain. In the present context, a target for providing user interfaces that people perceive as smooth and responsive includes frame durations of 16 ms or less, which corresponds to a frame rate of 62.5 FPS or higher.

"Frame preparation time" is the time spent preparing a frame, e.g., obtaining and/or generating the frame's pixel data and placing it in the frame buffer. Shorter frame preparation times contribute to faster frame rates, particularly when frame display content changes with each frame and frames are displayed as soon as they are prepared or shortly thereafter.

In computing system architectures that use retained mode graphics, frames are generated for a variety of reasons. Screen widgets and user interface controls may be animated or relocated. Windows may be opened, closed, resized, moved, or refreshed. Other displayed items may be animated, resized, rotated and/or translated, morphed, and otherwise altered in some way that invalidates a displayed frame and results in creation and display of a replacement frame.

Excessive or long frame preparation times can contribute to poor application performance and responsiveness. As used here, a "long frame preparation time" is one 17 ms or greater, and an "excessive frame preparation time" is a long frame preparation time that is also at least 5 ms longer than the previous frame's preparation time. However, one of skill recognizes that frame preparation times and frame rates may depend on the type of rendering system involved and other factors, even in some cases depending on the electrical power source of a computing system, since the available computing power may vary according to the available electrical power. Specific frame preparation times and frame rates are given herein as examples which illustrate, for example, the error of any allegation that the processes described herein are purely mental (they are not) or that they can be performed with a paper and pencil (they cannot).

It can be very difficult to determine what specific event or set of events caused a UI thread's frame to be prepared. Developers may manually inspect a large number of events and still be unable to determine precisely the root cause, namely, and the exact reason a frame was invalidated and hence the exact reason time and resources were taken to prepare a replacement for the invalidated frame. Timeline tools depend on locality of reference, which is imprecise. Under a familiar locality of reference approach, any of the numerous events that happened before a frame could be the cause of the frame, and it is left to developers to use their knowledge of the particular code to try and identify the small subset of events that actually caused the frame preparation. Moreover, some timeline tools do not even show events that are candidates for being the cause of a frame's creation.

Some embodiments presented herein attribute UI thread frame causality automatically. Some examine events that precede a UI thread frame and determine an event or subset of events that causes the frame preparation. Details used in various alternative embodiments are discussed.

Some embodiments described herein may be viewed in a broader context. For instance, concepts such as change, control, filtering, identification, invalidation, and/or time may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving change, control, filtering, identification, invalidation, and/or time are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as attributing frame preparation causality, increasing frame rate, and filtering out extraneous data. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein apply filters to isolate particular kinds of property changes. Third, technical effects provided by some embodiments include reduction of computational resource usage, such as less memory usage and/or less GPU usage. Fourth, some embodiments modify technical functionality of applications by optimizing retained mode graphics processing based on technical considerations such as consolidating property changes so they provoke a smaller number of frame preparations. Fifth, technical advantages of some embodiments include one or more of the following: simplified application development, reduced hardware requirements (memory, CPU, GPU), faster processing of a given frame preparation effort, reduced power consumption, reduced network usage, and reduced processing workloads.

Reference will be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

Some Additional Terminology

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Program" is used broadly herein, to include applications, kernels, drivers, interrupt handlers, firmware, state machines, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and wheeled personal mobility devices. These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software.

Frame rate improvements are part of some embodiments described herein. One of skill understands that frame preparation calculations simply cannot be performed rapidly enough by mental steps or by paper and pencil to provide the smoothness and responsiveness sought in software user interface frame sequences. In particular, the use of mental steps or strictly human computations would cause long and excessive frame preparation times. Similarly, confining frame causality attribution to mental steps or strictly human computations would make the control of display invalidation unwieldy, inefficient, and ineffective in comparison to the embodiments described herein.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as altering, applying, attributing, binding, bounding, changing, designating, displaying, eliminating, execution, filtering, identifying, increasing, inputting, invalidating, laying out, linking, listing, loading, modifying, obtaining, preparing, processing, producing, querying, reaching, receiving, reducing, referencing, rendering, resizing, serializing, sorting, tracing, treating, updating, or visualizing (or alters, altered, applies, applied, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the *In re Nuijten* case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, as an IoT node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game application may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more applications 120 have components such as a user interface 122, threads 124, object or other structure properties 126, routines 128, and user interface windows 130. Software development tools 132 such as compilers 134 and debuggers 136 assist with software development by producing and/or transforming code which implements components. A frame buffer 138 holds frames 140 which are displayed on a visual display 142. The application components, tools 132, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation.

The display 142 may include a touch screen, a screen which is responsive to input from a pen or tablet, or a screen which operates solely for output. In addition to processors 110 (CPUs, ALUs, FPUs, and/or GPUs), memory/storage media 112, display(s) 142, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A given operating environment 100 may include an Integrated Development Environment (IDE) 144 which provides a developer with a set of coordinated software development tools 132 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C # ("C-Sharp"), but teachings herein are applicable with a wide variety of programming languages, programming models, and programs, as well as with technical endeavors outside the field of software development per se.

An execution trace 146 may be present. The trace may be a product of a tool 132, application 120, user interface library 122, and/or kernel 148 which also resides on the system 102, or the trace may have been produced on another system and then transferred by a network, flash drive, or other mechanism to the present location. The trace may document execution of an application 120 which resides on the same machine as the trace, or the trace may document execution of an application run on a different machine.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Systems

Figure 2:
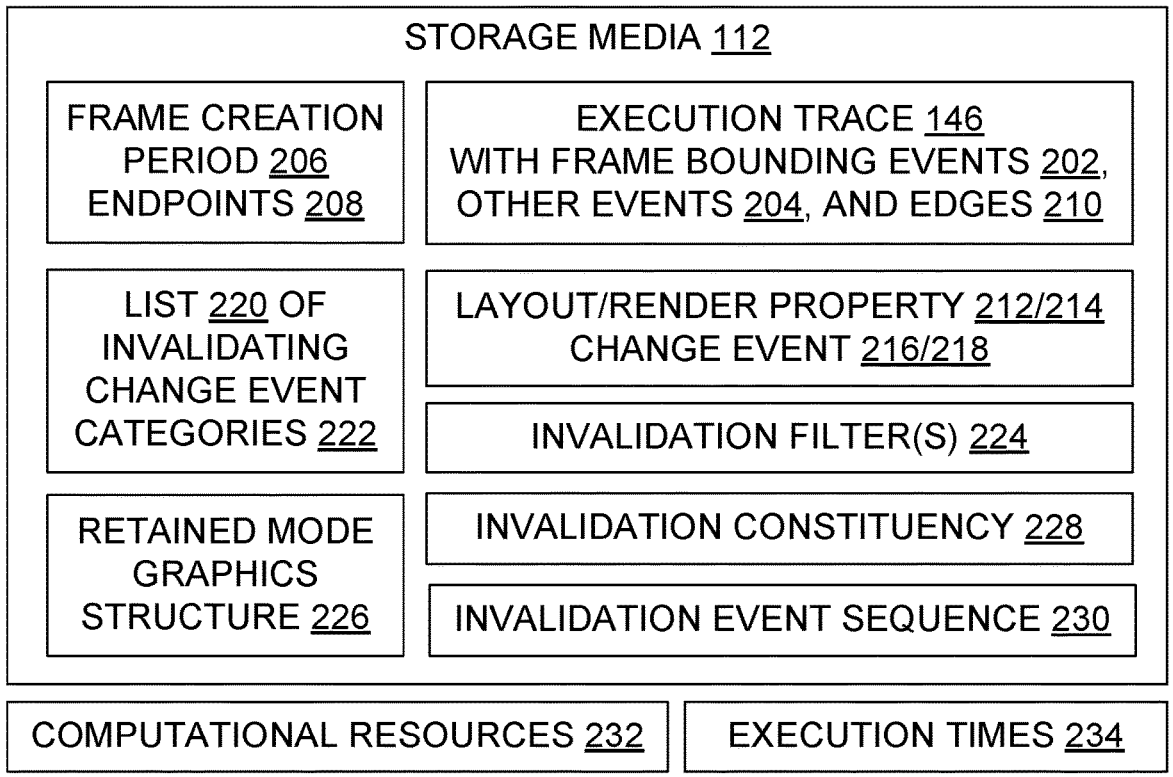
FIG. 2 is a block diagram illustrating an example architecture with aspects of frame invalidation control and causality attribution.

FIG. 2 illustrates aspects of an architecture which is suitable for use with some embodiments. An execution trace 146 has associated frame bounding events 202 and other events 204 for at least one frame creation period 206. Designation 204 refers to trace events generally; a frame bounding event 202 is a non-exclusive example of an event 204. In some implementations, bounding events may be virtual, in that they are injected by post-trace processing. For example, some execution traces do not contain a window resizing event as such, but do include one or more lower-level property change events that post-trace processing interprets as indication(s) of window resizing, e.g., based on a look-up table or hard-coded switch statement. Under such interpretation, the window resize event is a virtual frame bounding event. Similar considerations apply to page load, media query, binding update, and user input events—they may be explicit non-virtual frame bounding events in a given implementation's execution trace and/or they may be virtual frame bounding events which are inferred from the explicit content of an execution trace. The frame creation period has a start point and a finish point, collectively referred to as the period's endpoints 208. The execution trace 146 has a leading edge and a trailing edge, collectively referred to as the trace's edges 210. Either edge may coincide with an event 204, but in some cases a trace starts before the earliest traced event and in some it ends after the last of the traced events.

In some examples, the events 204 may include zero or more layout property change events 216 which each document a change in a layout property 212. The events 204 may include zero or more render property change events 218 which each document a change in a render property 214. Layout properties 212 and render properties 214 are examples of properties 126. Layout properties 212 document a display layout value, e.g., a relative or absolute screen position, a line width, a margin, or a visibility. Render properties 214 document a display render value, e.g., display resolution, color palette, number of gray levels, whether ray tracing is to be performed, and so on.

In some examples, zero or more of the layout properties 212 and zero or more of the render properties 214 reside in a list 220 of frame invalidating change event categories 222. That is, in these examples the list 220 itself is non-empty, but it may contain (a) one or more layout properties 212 only, or (b) one or more render properties 214 only, or (c) both at least one layout property 212 and at least one render property 214. The listed properties are properties whose change would (or should) provoke a re-creation of pixel content to display.

In some examples, one or more invalidation filters 224 include the list 220 or a subset of the list 220. In some examples, invalidation filters 224 operate at an object level, e.g., by specifying a list of graphic objects in a retained mode graphics structure 226. In some examples, invalidation filters 224 specify a list of routines, as window resize routines and CSS media query routines. More generally, in a given example an invalidation filter specifies one or more items which potentially (or in some cases, actually) invalidates a frame 140 when the item is changed or invoked.

In some examples, application of the invalidation filters 224 to trace events 204 whose timestamps lie within a particular frame's creation period 206 produces an invalidation constituency 228, namely, a set of events 204 which may have caused the prior frame's invalidation and hence caused the creation of the frame in question. When the invalidation constituency 228 is ordered chronologically, it serves as an invalidation event sequence 230.

Those of skill understand that a given event 204 represents consumption of computational resources 232. Some examples of computational resources 232 are cycles on a particular CPU 110 or GPU 110, space allocated in RAM 112 or other memory, exclusive control of a shared data structure such as a synchronization lock, or access to a display 142 or network interface card or other peripheral 106. A given event 204 may also have an associated execution time 234, e.g., the time spent executing a given routine 128 named in the event and all the routines which were invoked directly or indirectly by that named routine.

Figure 3:
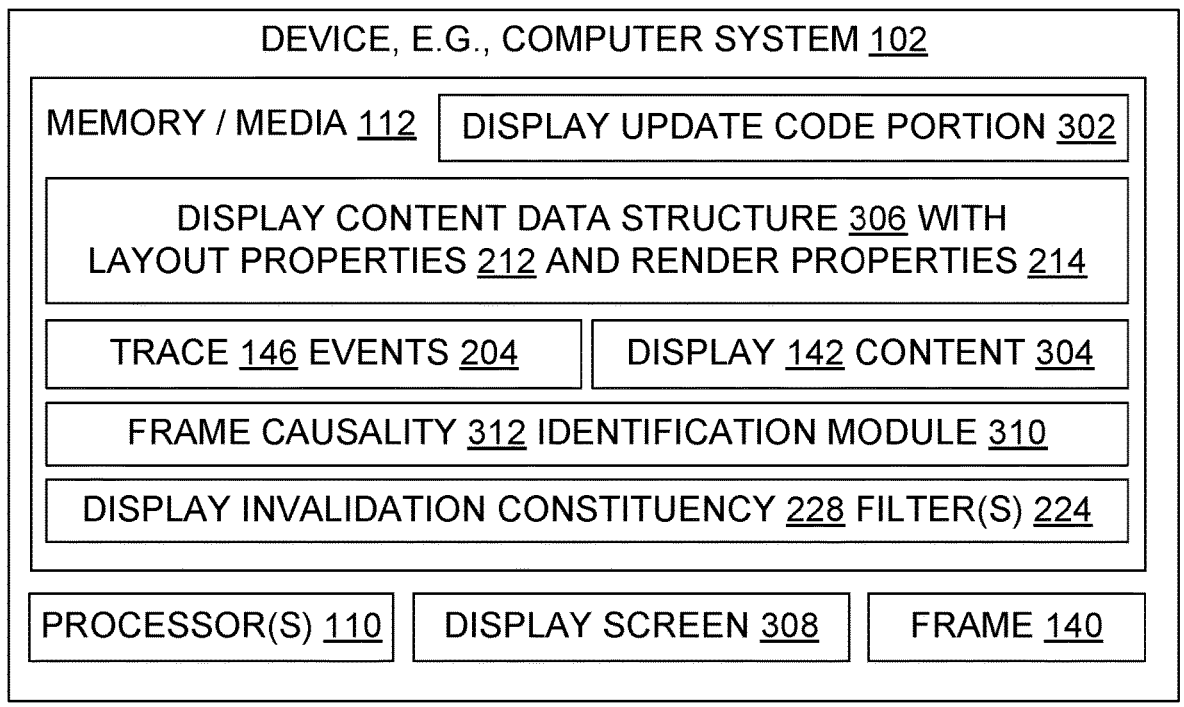
FIG. 3 is a block diagram illustrating another example architecture with aspects of frame invalidation control and causality attribution.

FIG. 3 illustrates aspects of an architecture which is suitable for use with some embodiments. A display update code portion 302 of the system operates to update pixels, alpha channels, or other display content 304 when a frame 140 is invalidated. Display content 304 is implemented using display content data structures 306 which include objects, structs, records, or other structures 306 that have layout properties 212 and/or render properties 214. A frame 140 is invalidated by a change in a layout property 212 and/or by a change in a render property 214. After frame invalidation, a different frame is prepared for display on a display screen 308. A display 142 includes at least a display screen 308 and may also include input sensors such as touch sensors, magnetic sensors, or optical beam sensors.

Property 212, 214 changes and other events executed in the system 102 can be traced using injected breakpoints, interrupt handlers, exception handlers, macros, trace preprocessors, kernel markers, and other familiar technologies, or trace mechanisms created hereafter. Trace events 204 are typically low level information such as a change in a particular variable (which may be a property or some other variable), throwing a particular exception, a particular routine invocation, or reaching a particular code branch. Trace file formats vary widely. Property names, routine names, other identifiers, and event titles are normally given in the natural language used by the developer(s) of the traced application, or something close to it, as opposed to being localized to the natural language of the application's end user.

A frame causality identification module 310 applies invalidation filters 224 to trace events 204 to produce an invalidation constituency 228 which includes events that are (or can be) sorted chronologically. The earliest event in the invalidation constituency 228 is designated a frame causality 312. Alternatively, some embodiments mark multiple layout and/or property changing events as the frame causality 312. Also, some embodiments do not sort events chronologically. Some eliminate the sorting step and designate multiple events as the frame causality.

Figure 4:
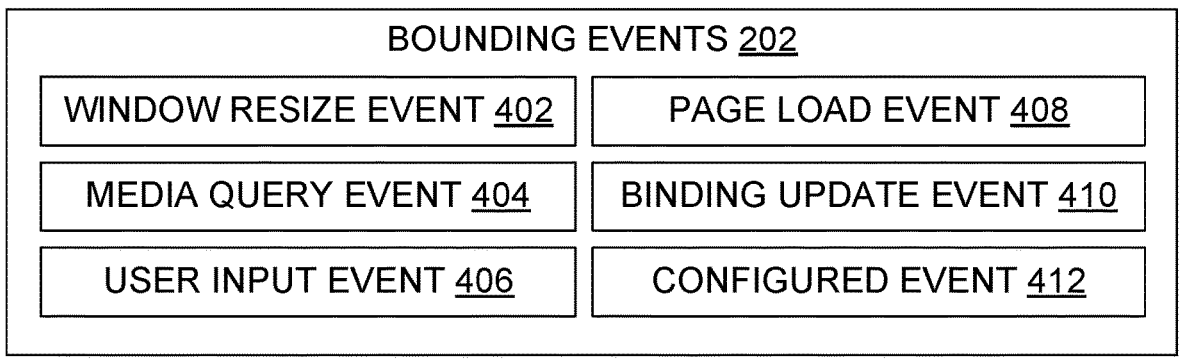
FIG. 4 is a block diagram illustrating frame bounding events.

FIG. 4 illustrates some frame bounding events 202. A window resize event 402 denotes a change in the size of a user interface window which is displayed in a frame 140. Note that frame 140 pertains to the frame buffer and to pixels regardless of whether they happen to be part of a window; "frame" as used here does not refer to a window border or outline. A media query event 404 denotes a query to determine viewing device 308 type, width, height, orientation, resolution, aspect ratio, and/or color depth, for example. Media query events 404 serve different style sheets in CSS in some examples. A user input event 406 denotes receipt of user input from a touch screen, keyboard (hard key or virtual), mouse, pen, microphone, camera, or other peripheral 106 capable of receiving user input. A page load event 408 denotes server control of a user interface page object, invocation of an interface page-load routine, or similar event. A binding update event 410 denotes a change in a binding between a data variable, such as a table or list entry, and a user interface element for obtaining a value, such as a textbox or set of radio buttons, for example. A configured event 412 is any other event in a trace 146 which a given system is configured to treat as a bounding event 202.

Figure 5:
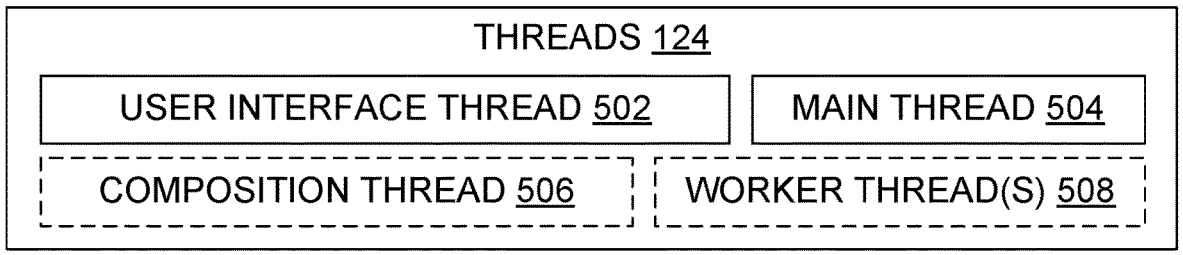
FIG. 5 is a block diagram illustrating threads.

FIG. 5 illustrates some threads 124. A user interface thread 502 performs and/or coordinates user interface operations such as updating a screen 308 and obtaining user inputs. A main thread 504 initiates and coordinates (and sometimes terminates) the other threads in an application, including the user interface thread 502, any composition threads 506, and any worker threads 508. A composition thread 506 is a particular kind of worker thread 508. A composition thread performs graphics composition to combine to images or text into a frame 140. A worker thread 508 performs specific computational work, e.g., image composition, position calculation, ray tracing, encryption, decryption, compression, decompression, and so on.

Figure 6:
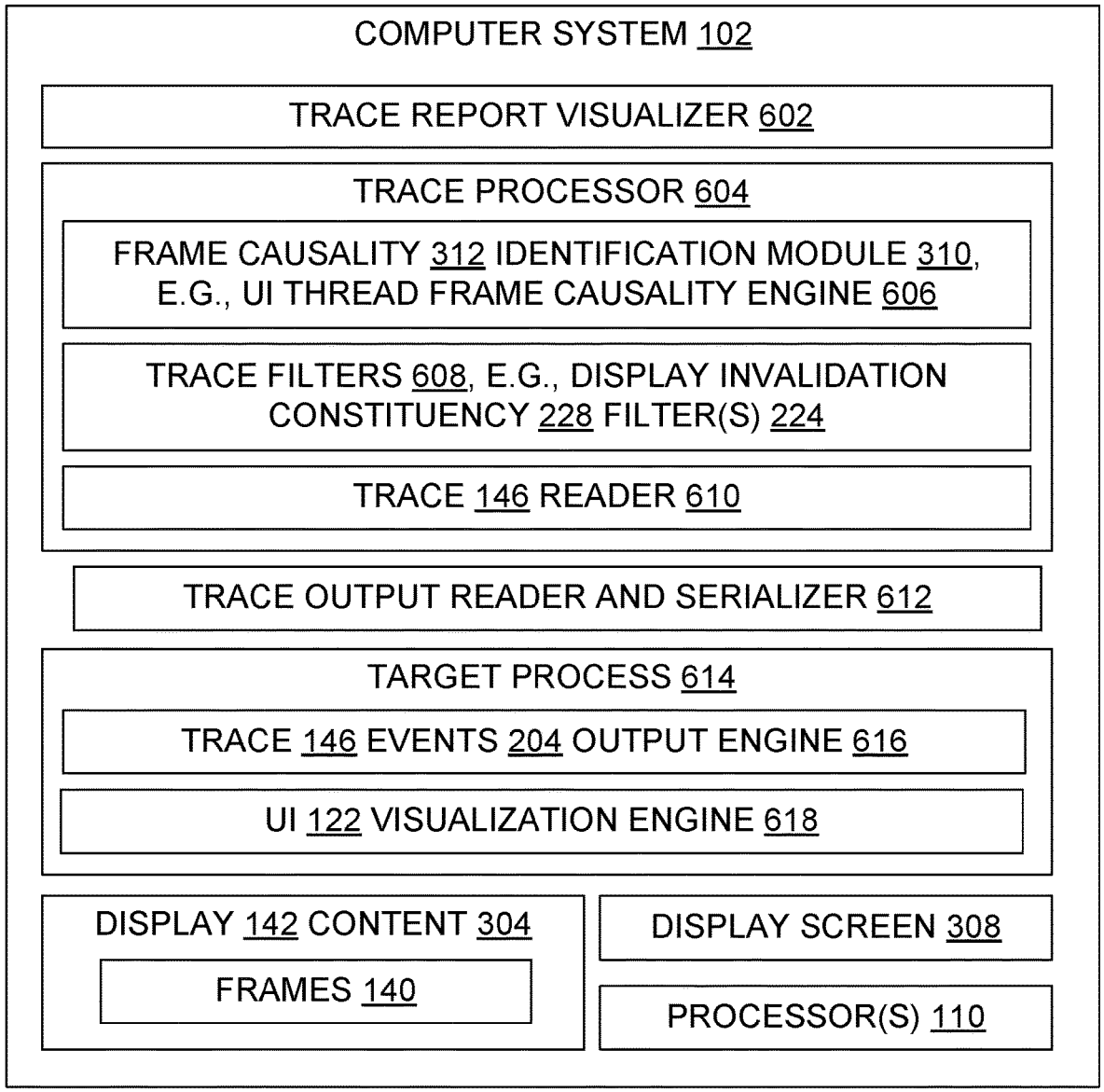
FIG. 6 is a block diagram illustrating a further example architecture with aspects of frame invalidation control and causality attribution.

FIG. 6 illustrates aspects of an architecture which is suitable for use with some embodiments. A trace report visualizer 602 receives a chronologically ordered list of events 204 and causality information 312 around UI thread frames 140 from a trace processor 604. The trace report visualizer 602 displays this data in views to the user 104, e.g., in a Gantt chart formatted, sorted by duration or start time. The trace processor 604 reads 610 in traces 146, applies filters 608 and sorts the events, runs a UI thread frame causality engine 606 on the traces 146, marks events 228 that are precursors of the UI thread frames as being such, and stores this information in memory 112, from which it is then accessed by the trace report visualizer 602. Filters 608 may include filters 228 to identify layout and render property change events, as well as other filters such as time period constraints or thread 124 identifiers. The trace reader 610 may read from a network connection if the trace was sent from a remote machine in a serialized 612 form.

The trace 146 includes a record of some (but rarely if ever all) events that occurred during execution of a target process 614. In the target process, events may include events 204 that impact layout, render, composition and many other operations. Events (in the sense of data) are emitted by instrumentation as the events (in the sense of occurrences) happen, by a trace output engine 616 which resides in the process 614 in the illustrated example. This example also includes a UI visualization engine 618.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly and linguistically with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, an application 120 may run on one or more devices/systems 102 in a networked cloud for which trace events 204 may be captured on all or a subset and then transferred to yet other devices within the cloud, and controlling alterations may then be made on yet other cloud device(s)/system(s) 102.

With reference to FIGS. 1 through 6, some embodiments provide a computer system 102 with a logical processor 110 and a memory medium 112 configured by circuitry, firmware, and/or software to provide technical effects directed at technical problems by extending functionality as described herein.

Some embodiments include a computing system 102 having at least one processor 110, at least one memory 112 in operable communication with the processor(s), a display screen 308, and at least one display content data structure 306 having layout properties 212 and render properties 214 (possible in separate objects or other separate substructures of structure 306. A display update code portion 302 includes code which upon execution by the processor(s) updates display content 304 on the display screen in response to a change in at least one layout property and/or a change in at least one render property. An execution trace 146 resides in the memory and contains events 204. At least one display invalidation constituency filter 224 also resides in the memory 112. A frame causality identification module 310 includes code which upon execution by the processor(s) applies the display invalidation constituency filter(s) to the execution trace, thereby producing a display invalidation constituency 228 which includes an event sequence 230 for a frame 140. The event sequence contains at least one layout property change event 216 and/or at least one render property change event 218. In some embodiments, the frame causality identification module also designates an earliest event of the display invalidation constituency as a cause 312 of the frame.

In some embodiments, the event sequence contains at least one frame bounding event 202. In some, a window resizing event 402 is present. In some, a page load event 408 is present. In some, a media query event 404 is present. In some, a binding update event 410 is present. In some, a user input event 406 is present.

In some embodiments, the display update code portion 302 includes a retained graphics data structure, namely, an API and/or other data structure which implements retained mode graphics.

In some embodiments, the display update code portion 302 includes a user interface thread 502.

In some embodiments, the frame causality identification module 310 includes code which upon execution by the processor(s) determines a root cause 312 of an element's participation in frame 140 creation. The element may be a window, widget, or other UI element.

Some embodiments combine aspects of one or more of the embodiments of the preceding five paragraphs. Some include other aspects depicted in the Figures. For example, some embodiments include a trace report visualizer 602 and/or other aspects shown in FIG. 6.

In some embodiments, the frame 140 has a frame preparation time of at least 17 milliseconds but less than one second. This excludes purely mental embodiments because frames 140 are not mental artifacts. This also excludes approaches that rely on human computation because such computation of frame 140 content would far exceed 1 second. People simply cannot do calculations quickly enough by hand to provide a frame rate of even 1 FPS.

Processes

Figure 7:
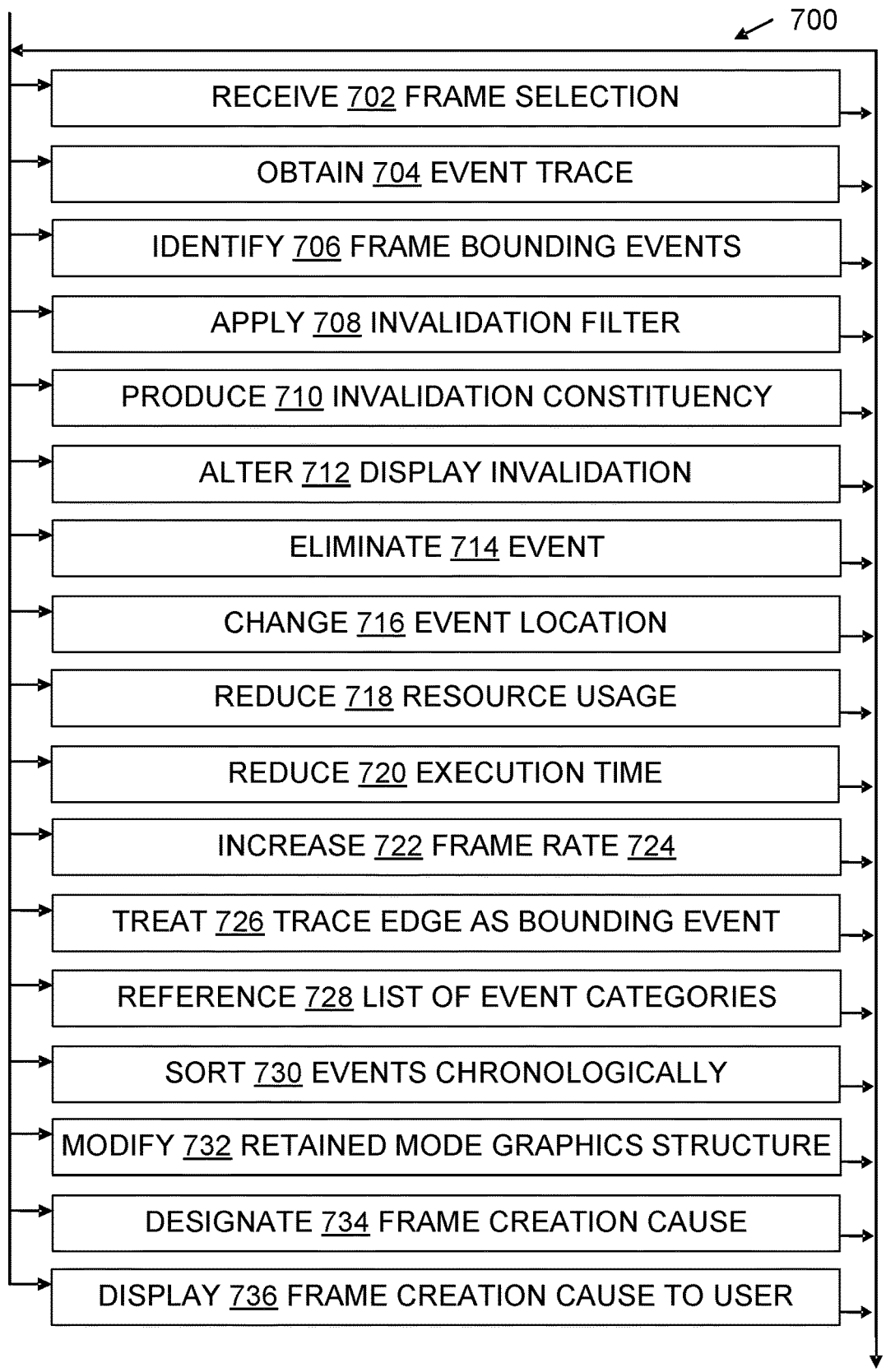
FIG. 7 is a flow chart illustrating aspects of some process and configured storage medium embodiments.

FIG. 7 illustrates some process embodiments in a flowchart 700. Technical processes shown in the Figures or otherwise disclosed may be performed in some embodiments automatically, e.g., under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 7. Steps may be performed serially, in a partially overlapping manner, or fully in parallel. The order in which flowchart 700 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

During a step 702, an embodiment receives a frame selection. The selection may be specified in absolute or relative terms, and may take the form of a frame number, a time code, a timestamp, or a time interval. The selection may be made through a tool user interface.

During a step 704, an embodiment receives an event trace. The trace may be specified by an absolute or relative file name, or an application name, for example, and may be local or transferred over network from a remote location.

During a step 706, an embodiment identifies one or more frame bounding events. They may be identified interactively by a user from frame events that were previously identified automatically, or they may be identified entirely automatically by scanning the event trace, parsing events, and comparing them to a pattern or list of recognized bounding events 202.

During a step 708, an embodiment applies an invalidation filter to filter out events which do not invalidate frames and/or are not consistent with the filter requested, e.g., lie outside the creation period of the frame that is currently of interest. Filtering may be accomplished by scanning the event trace, parsing events, and comparing them to a pattern or list of recognized frame invalidation events such as layout or render property change events 216, 218.

During a step 710, an embodiment produces an invalidation constituency. This is accomplished by marking events, copying them from the event trace, or otherwise distinguishing events which pass the invalidation filter from events that do not.

During a step 712, an embodiment alters display invalidation by implementing at least of the following steps: eliminating 714 a frame invalidation event, changing 716 the location of a frame invalidation event so it occurs at a different relative point in the creation of frame(s), reducing 718 usage of a computational resource during the creation of frame(s), reducing 720 execution time of a layout routine and/or a render routine, or increasing 722 an application's frame rate 724.

During a step 726, an embodiment treats a trace edge as a bounding event. As a simplified example, assume a trace contains the following items with the indicated timestamps (given in milliseconds):

0: trace start
1: main thread initialization complete
2: user authentication complete
3: property X changed without invalidating frame 5: media query event initiated
6: user input event, layout property changed
7: page load event, render property changed
10: property Y changed without invalidating frame
13: property Z changed without invalidating frame
14: exception raised
[application terminated]

In this simplified example, the trace has a leading edge at 0 ms and a trailing edge at 14 ms. The application termination does not appear in the trace, but is inferred from the presence of an exception as the last entry. The first bounding event is the media query event at 5 ms. The trailing edge can be treated as a bounding event. Invalidating events include the bounding events at times 5, 6, and 7 ms, and the property changes at times 6 and 7 ms.

During a step 728, an embodiment references a list of event categories, e.g., a list of property change events that invalidate a frame, such as a list of layout properties or render properties that could appear in a trace. For example, some implementations check a pre-existing list of properties to figure out whether a property change event in the trace is a layout event or a render event, or an event the tool processing the trace for frame causality attribution or invalidation can ignore because it does not impact frame rate or frame creation resource usage.

During a step 730, an embodiment sorts trace events chronologically according to their respective timestamps.

During a step 732, an embodiment modifies a retained mode graphics structure, e.g., by changing layout properties or render properties in objects that model display elements.

During a step 734, an embodiment designates a frame creation cause, e.g., by identifying the earliest frame invalidating event within a specified frame's creation period. In the simplified example above, the media query event at 5 ms would be designated as the cause, even though no frame was created because the program terminated.

During a step 736, an embodiment displays a frame creation cause, e.g., by identifying it as such in a developer tool UI.

Some embodiments provide a process for controlling display invalidation. The process includes identifying 706 frame bounding events in an execution trace of a multi-threaded application. The execution trace includes a plurality of thread events within a frame creation period which has endpoints that match the frame bounding events. This process also includes applying 708 at least one display invalidation constituency filter to the plurality of thread events within a frame creation period, thereby obtaining 710 a display invalidation constituency which includes an event sequence. The event sequence contains at least one of the following display invalidation events: a frame display layout property change event, a frame display render property change event.

This process also includes altering 712 display invalidation by performing at least one of the following actions on at least part of the display invalidation constituency: eliminating 714 at least one frame display layout property change event, eliminating 714 at least one frame display render property change event, changing 716 a location of at least one frame display layout property change event in the event sequence, changing 716 a location of at least one frame display render property change event in the event sequence, reducing 718 computational resource usage of at least one frame display layout property change event in the event sequence, reducing 718 computational resource usage of at least one frame display render property change event in the event sequence, reducing 720 thread execution time of at least one frame display layout property change event in the event sequence, reducing 720 thread execution time of at least one frame display render property change event in the event sequence. However, some other examples omit the altering step.

In some examples, the display invalidation control process identifying step includes identifying 706 at least one of the following frame bounding events: a window resizing event, a page load event, a media query event, a binding update event, or a user input event.

In some examples, the display invalidation control process identifying step 706 includes treating 726 an execution trace edge as a frame bounding event.

In some examples, the display invalidation control process applying step 708 includes referencing 728 a list of invalidating property change event categories which is distinct from the execution trace and existed prior to creation of the execution trace.

In some examples, the display invalidation control process applying step 708 includes sorting 730 display invalidation events chronologically.

In some examples, the display invalidation control process altering step 712 includes modifying 732 a retained mode graphics structure, e.g., by changing a property value therein, setting or clearing a flag, or updating a timestamp.

In some examples, the display invalidation control process further includes designating 734 at least part of the display invalidation constituency to a user as a display frame creation cause.

Figure 8:
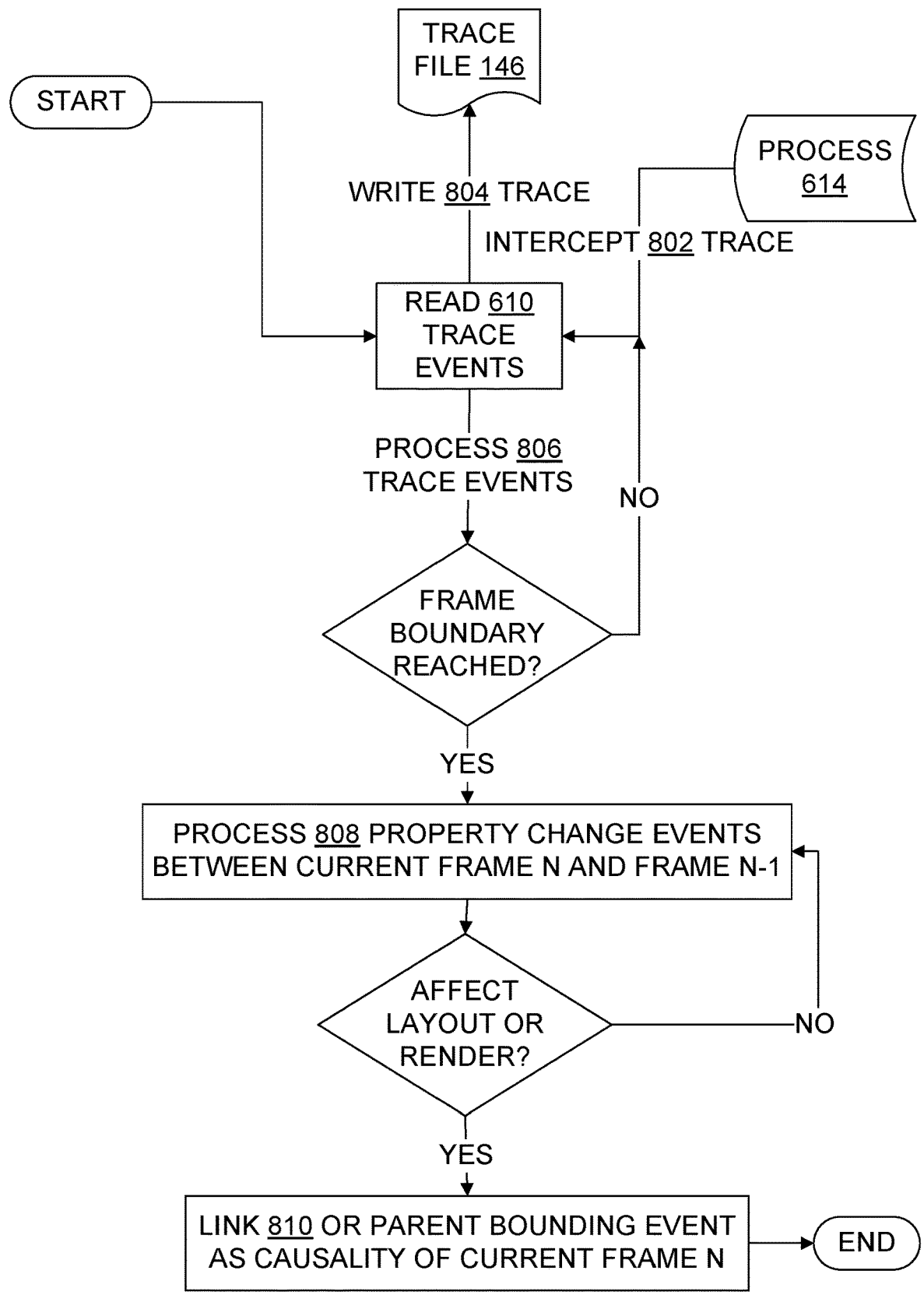
FIG. 8 is another flow chart illustrating aspects of some process and configured storage medium embodiments.

Some embodiments are consistent with to FIG. 8. Such an embodiment intercepts 802 trace 146 information, by reading 610 events that are written 804 to a trace file or by receiving live instrumentation output, for example. The trace events are scanned, filtered, and/or otherwise processed 806 to identify frame bounding events and trace edges. After frame boundaries are reached, property change events for a frame of interest are scanned, filtered, and/or otherwise processed 808 to obtain a sequence of events which impact layout and/or rendering and hence may invalidate the frame. The earliest of these events, or its parent bounding event 202, is digitally linked 810 to the frame as the frame's causality.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as invalidation filters 224, frame bounding events 202, and/or a frame causality identification module 310, in the form of data 118 and instructions 116, read from a removable medium 114 and/or another source such as a network connection, to form a configured medium. The configured medium 112 is capable of causing a computer system to perform technical process steps for display invalidation and/or frame causality attribution as disclosed herein. FIGS. 1 through 8 thus help illustrate configured storage media embodiments and process embodiments, as well as system and process embodiments. In particular, any of the process steps illustrated in FIG. 7 and/or FIG. 8, or otherwise taught herein, may be used to help configure a storage medium to form a configured medium embodiment.

In some examples, a computer-readable storage medium is configured with data and instructions which upon execution by at least one processor control user interface display invalidation in a computing system at least in part by a process. This process includes identifying 706 at least two of the following frame bounding events in an execution trace of a multi-threaded application: a window resizing event, a page load event, a media query event, a binding update event, or a user input event, the execution trace including a plurality of thread events within a frame creation period which has endpoints that match the frame bounding events. This process also includes applying 708 at least one display invalidation constituency filter to thread events in the execution trace which are bounded by the frame bounding events. This process also includes altering 712 user interface display invalidation in the computing system by eliminating at least one of the following: a frame display layout property change which occurs between the frame bounding events, or a frame display render property change which occurs between the frame bounding events. Some other examples omit the altering step.

In some examples, the applying step 708 includes referencing 728 a list of invalidating property change event categories which is distinct from the execution trace and existed prior to creation of the execution trace, e.g., by a look-up.

Some examples further include designating 734 at least one event to a user as a display frame creation cause. In some, the designated display frame creation cause consists of a single event which impacted frame layout or frame rendering or both.

In some examples, applying 708 at least one display invalidation constituency filter produces 710 multiple events, each of which impacted frame layout or frame rendering or both, and the process further includes designating 734 the earliest of the multiple events to a user as a display frame creation cause.

Some examples include displaying 736 application display frame creation causality to a user in a development tool using at least a timeline.

Some examples provide a technical process for identifying user-interface thread frame causality, including finding a complete user-interface thread frame in an execution trace (e.g., by identifying 706 frame bounding events and/or treating 726 a trace edge as a bounding event 202), and specifying a set 228 of zero or more property change events 216, 218 which are associated with the complete user-interface thread frame. When the set 228 contains only a single property change event, and the single property change event altered a display content 304, then the process includes indicating 734 that the user-interface thread frame causality is the single property change event. When the set 228 contains multiple property change events 216, 218, then the process includes indicating that the user-interface thread frame causality is the set 228 of events. Otherwise the process includes indicating 736 that the user-interface thread frame causality is undetermined. The process may also include sorting 730 the events 204 based on start times.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from Visual Studio® documentation (mark of Microsoft Corporation). The various versions of Visual Studio® tools are programs implemented by Microsoft Corporation. Aspects of the Visual Studio® programs and/or documentation are consistent with or otherwise illustrate aspects of the embodiments described herein. However, it will be understood that Visual Studio® documentation and/or implementation choices do not necessarily constrain the scope of such embodiments, and likewise that Visual Studio® software and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Given a set of N property change events, some implementations can determine the root cause of an element's participation by looking at the first property change event 204 that either changed a property on the element under inspection or one of its parent bounding events 202.

Some implementations provide or use the following elements: display screen 308, display buffer 138, retained graphics model 226, property 212, 214, property change event 216, 218, frame 140, frame preparation/generation period 206, frame event boundaries 202, 210, frame events generally 204, frame display layout, frame display rendering, threads 124, an execution trace 146. In some, a display invalidation constituency 228 is a sequence of property changes which caused frame preparation and/or generation. In some, control is exerted by eliminating, moving, and/or reducing resource usage which results in a property change and/or by reducing processing time which led to the property change.

By treating 736 a trace edge as a frame boundary, some examples attribute frame causation despite dropped events which occurred during execution but are not reflected in the trace 146.

By attributing frame causation despite the presence of many (e.g., hundreds and/or at least 80%) events in a trace that do not impact frame invalidation, some examples improve development efficient by identifying fruitful targets for optimization. Some optimizations then alter 712 invalidation by removing unnecessary frames. Some optimizations then alter 712 invalidation by reducing excessive frame preparations for the frames that are deemed necessary (e.g., because they present data the end user expects to see or data that notifies the end user of status changes the end user would respond to).

In some implementations, the higher level sematic events (bounding events) that describe layout causality include: Windows Size Changed, Page Load, State Changed, Binding Updates, Input. Some implementations omit one or more of these bounding events. Some implementations include one or more other bounding events, such as those listed below in discussing a development tool 132 user interface.

In some examples, a tool 132 user interface, such as an IDE 144 user interface, displays some or all of the following data with corresponding labels: a diagnostic session length in seconds; a bar chart of UI thread utilization with a legend for color codes distinguishing parsing, layout, render, I/O, app code, XAML, and other activities; a line graph of visual throughput in FS with a legend for color codes distinguishing a composition thread from a UI thread; a timeline with detail headings or links or other options for obtaining details on virtual frame bounding events such as application startup, parsing (app), window resized, page load (MainPage), parsing (MainPage), one or more layout activity sections, one or more render activity sections, and one or more disk (dll) activity sections within a layout or render section. In some examples, one can attribute frame creation to property changes at a relatively low level of generality and/or attribute frame creation to virtual events (e.g., user input received, window resized) at a higher level of generality.

As to scenarios where an implementation can be used to understand why specific elements participated in Layout or Render, in some cases, given a set of N property change events, an implementation can determine the root cause of an element's participation by looking at the first property change event that either changed a property on the element under inspection or one of its parents. This helps a developer troubleshoot issues when large number (hundreds or more) of elements take part in layout, thus increasing the total layout time proportionately.

Some implementations rely on, or include and rely on, instrumentations in place in a platform. Instrumentation provides an ability to monitor property 126 changes in the application 120. Instrumentation may also provide a classification methodology to help developers understand which events impact frame invalidation. Instrumentation may also provide an ability to monitor application scenarios like StateChange (e.g., media query execution in HTML), Windows Resized, Transient or Binding expression updates.

In some examples, after the trace for the session is collected and processed (either in real-time or postmortem), the implementation finds all the complete UI thread frames and their intervals. A UI thread is a thread whose responsibilities include generation of user interface frames to be displayed to a user. For each UI Thread Frame 'n' the module 310 looks at all property changes and their bounding events such as State Change, Windows Resized, and Binding Updates, that occur after the 'n-1' frame. If there exists only a single PropertyChanged event that either affected Render or Layout then that event is classified 734 as the causality of the UI Thread Frame and presented 736 as such to the user. If multiple property changes and their bounding events are encountered then the first one (sorted 730 on start time) is classified as the first change and the whole set is classified as the causality of the Frame Preparation, because most platforms batch such changes to avoid layout cycles in the platform.

In some examples, Gantt chart based timeline views and/or other visualizations configure a display in a tool. In some, causality chained events can be viewed in dependency chains which show links from the frame in question to the underlying causality event or events. Some implementations highlight causality events in a developer's view when the frame in question is highlighted in the tool user interface.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Some examples include a means for attributing frame causation which includes software that identifies 706 frame bounding events 202 and filters 708 out other events 204 from an execution trace 146. Some examples include a means for attributing frame causation which includes software that filters 708 out execution trace 146 events 204 that are not layout property change events 216 and are not render property change events 218. Some examples include a means for attributing frame causation which includes software that performs frame bounding event identification 706 and exclusion of events 204 that are not layout property change events 216 and are not render property change events 218.

Some examples include a means for attributing frame causation which includes software that operates in a manner consistent with the flowchart of FIG. 8. Some examples include a means for attributing frame causation which includes software that operates in a manner consistent with the flowchart of FIG. 7.

Some examples include a means for attributing frame causation which includes the following items, consistent with FIG. 2: invalidation filters 224, a list 220. Some examples include the following items, consistent with FIG. 3: display update code portion 302, frame causality identification module 310. Some examples include a trace processor 604. Some examples include the following items, consistent with FIG. 6: trace report visualizer 602, trace processor 604.

Some examples operate on traces for an application that includes a US thread 502, whereas other examples do not, e.g., they operate on traces from an application that is not multi-threaded.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 7 and 8 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process suitable for getting faster frame rates when rendering pages, the process comprising:
   proactively automatically identifying frame bounding events in an execution trace of an application which displays rendered frames, the execution trace including a plurality of traced events within a frame creation period which has endpoints that match the frame bounding events, the identifying comprising comparing events to a pattern of recognized frame bounding events or a list of recognized frame bounding events or both;
   proactively automatically filtering traced events which are within the frame creation period, thereby proactively automatically obtaining from the execution trace a display invalidation event sequence located within the frame creation period, the display invalidation event sequence containing a frame display property change event; and
   using the obtained display invalidation event sequence, by reducing execution time of the display invalidation event sequence by optimizing a frame processing which corresponds to the frame display property change event.

2. The process of claim 1, wherein reducing execution time of the display invalidation event sequence comprises optimizing the frame processing of a web page.

3. The process of claim 1, wherein reducing execution time of the display invalidation event sequence comprises optimizing the frame processing of hypertext markup language.

4. The process of claim 1, wherein identifying frame bounding events in the execution trace comprises identifying a page load event.

5. The process of claim 1, wherein reducing execution time of the display invalidation event sequence comprises optimizing the frame processing of a user interface to a social networking service.

6. The process of claim 1, wherein optimizing the frame processing comprises at least one of the following:
   eliminating the frame processing of the frame display property change event;
   changing a location in the event sequence of the frame processing of the frame display property change event;
   reducing computational resource usage by the frame processing of the frame display property change event; or
   reducing execution time of the frame processing of the frame display property change event.

7. The process of claim 1, wherein reducing execution time of the display invalidation event sequence comprises optimizing the frame processing of an interface to a device which resides in a cloud environment.

8. The process of claim 1, wherein reducing execution time of the display invalidation event sequence comprises optimizing the frame processing of an interface to an internet of things node.

9. A computer-readable storage medium configured with data and instructions which, upon execution by at least one processor, assist frame rate increases by controlling user interface display invalidation in a computing system, at least in part by a process which comprises:
   proactively automatically identifying at least two frame bounding events inferred from an execution trace file of an application;
   proactively automatically applying at least one display invalidation constituency filter to events in the execution trace file which are bounded by the frame bounding events; and
   proactively automatically designating at least one event to a user as a display frame creation cause, thereby assisting optimization of processing to increase a frame rate.

10. The computer-readable storage medium of claim 9, wherein the process further comprises:

in response to a result of applying the at least one display invalidation constituency filter, altering user interface display invalidation in the computing system by eliminating a frame display property change which occurs between the frame bounding events; and obtaining an increased frame rate after the altering, relative to a frame rate before the altering.

11. The computer-readable storage medium of claim 10, wherein the process comprises obtaining an increased frame rate when rendering frames according to at least one of the following: a web page, hypertext markup language.

12. The computer-readable storage medium of claim 9, wherein the process further comprises optimizing a processing of at least a portion of a display content data structure.

13. The computer-readable storage medium of claim 9, wherein the process further comprises displaying a timeline which provides a user with a capability for obtaining details on one or more frame bounding events.

14. The computer-readable storage medium of claim 9, wherein the identifying comprises comparing events to a list of recognized frame bounding events.

15. A computing system configured to assist development of software which has an increased frame rate, the computing system comprising:

one or more processors;

at least one memory in operable communication with the one or more processors;

a display screen;

a display update code portion which upon execution by the one or more processors updates display content of one or more frames on the display screen in response to a change in at least one frame display property;

an execution trace of a traced application program, the execution trace residing in the memory outside of the traced application program and containing events which trace execution of the traced application program; and a frame causality identification module which upon execution by the one or more processors automatically produces a display invalidation constituency which includes an event sequence for a selected frame, the event sequence containing at least one frame display property change event, and wherein the frame causality identification module also automatically designates an earliest event of the display invalidation constituency as a cause of the selected frame.

16. The computing system of claim 15, wherein the computing system would benefit from an increased frame rate to help avoid eye strain in that the selected frame has a frame preparation time greater than 22 milliseconds.

17. The computing system of claim 15, wherein the computing system would benefit from an increased frame rate to help provide a perception of smoothness and responsiveness in that the selected frame has a frame preparation time greater than 16 milliseconds.

18. The computing system of claim 15, wherein the display update code portion comprises a user interface thread.

19. The computing system of claim 15, further comprising a network connection to a web server, and wherein the display content includes display content sent from the web server to the computing system.

20. The computing system of claim 15, comprising at least one of the following: a desktop computer, a laptop computer, a workstation, a smartphone, a tablet.

* * * * *